Sept. 3, 1929.    J. A. CARLTON    1,726,886
AGRICULTURAL IMPLEMENT
Filed April 23, 1928

John A. Carlton, Inventor
By C.A.Snow & Co.
Attorneys

Patented Sept. 3, 1929.

1,726,886

UNITED STATES PATENT OFFICE.

JOHN A. CARLTON, OF ATLANTA, GEORGIA.

AGRICULTURAL IMPLEMENT.

Application filed April 23, 1928. Serial No. 272,117.

The object of this invention is to provide a novel means for supporting the rear end of the frame of an agricultural implement and, particularly, to provide a means whereby this may be accomplished in the cotton chopper shown in my prior Patent No. 738,659.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1:
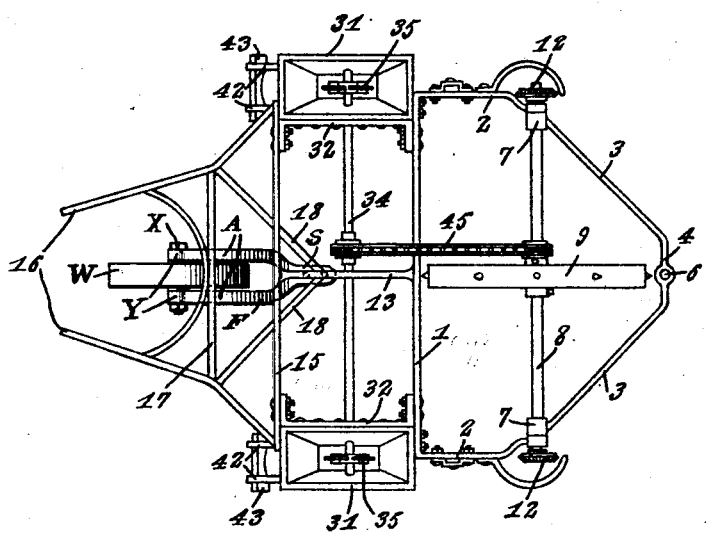
Figure 2:
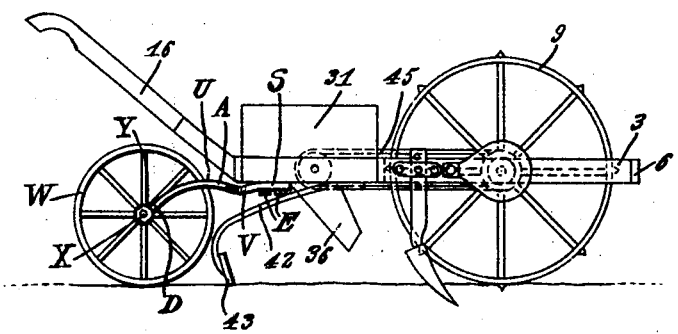

Figure 1 shows in top plan, a device constructed in accordance with the invention; and Figure 2 is a side elevation of the structure depicted in Figure 1.

In this specification, parts of the device shown in Patent No. 738,659 will be described, in order that the relation of the device forming the subject matter of this application to the prior art may be understood readily. Notice will be given when the description of what is old comes to an end, and when the description of what is new begins.

In the drawings there is shown the frame of an agricultural implement, the frame being adapted to be used either as part of a cotton chopper, or as part of a seeder, and the frame embodies a cross bar 1 having forwardly extended side pieces 2 provided with converging parts 3 joined by a front piece 4 having an eye 6 to which the draft means (not shown) may be attached. The converging parts 3 are supplied near to their rear ends with bearings 7 in which a main shaft 8 is journaled for rotation. A main ground wheel 9 is secured to the shaft 8. On the outer ends of the main shaft 8 there are gears 12, adapted to be used when the frame is employed as part of a cotton chopper (not shown).

A brace 13 extends backwardly from the intermediate portion of the cross bar 1, the rear end of the brace 13 being connected to a cross piece 15 disposed parallel to the cross bar 1. The cross piece 15 and the cross bar 1 are connected near to their outer ends by brackets 32.

Seed hoppers 31 are secured to the brackets 32 and fit between the outer ends of the cross bar 1 and the cross piece 15. Seed tubes 36 extend downwardly and forwardly from the hoppers 31. A shaft 34 is journaled in the brace 13 and in the hoppers 31. The shaft 34 carries seed disks 35, by means of which the contents of the hoppers 31 is caused to flow readily through the seed tubes 36. The shaft 34 is operatively connected to the shaft 8 by means of a chain and sprocket drive 45. Spring brackets 42 are secured to the frame work of the machine and carry coverers 43, of usual construction, operating behind the seed tubes 36.

Handle members 16 are secured at their forward ends to the cross piece 15 and are connected by a brace 17 disposed parallel to the cross piece 15. Forwardly converging braces 18 connect the handles 16 with the brace 13. The handles 16 converge as they extend rearwardly and the handles slant upwardly and backwardly, as shown in Figure 2.

Having thus described the structure which is shown substantially in Patent No. 738,659, I will now allude to the details which characterize the present invention patentably.

It has been found heretofore that in the device described above, a considerable amount of unnecessary work is imposed upon the operator, because there is no support for the rear end of the frame, the operator being called upon to carry some of the weight, by means of the handles 16, as well as to guide and direct the implement in its course.

In order to overcome the difficulty alluded to above, I supply a spring fork F, including a shank S and approximately parallel arms A extended rearwardly from the shank. The shank S is attached by securing elements E to the underside of the bracket 13. At their point of juncture with the shank S, the arms A are downwardly convexed as shown at V to clear the cross piece 15, so that none of the resiliency of the arms A may be lost. To the rear of the convexed portions V, the arms A are curved upwardly, as shown at U, the ends D of the arms being extended downwardly and rearwardly and terminating in eyes Y in which an axle X is secured. A supplemental or load-supporting wheel W is mounted to turn on the axle X and is located between the arms A.

The wheel W carries practically all of the weight of the machine which is not carried by the main ground wheel 9, and the operator, as a consequence can handle the machine for long periods of time, without fatigue. The spring arms A support the rear end of the frame yieldably to the comfort of the operator. Owing to the fact that the arms A are resilient, the operator, if he wishes, can force the frame of the machine downwardly to a limited extent, thereby to regulate the penetration of the coverers 43 into the ground.

What is claimed is:—

An agricultural implement comprising a frame including a cross bar and a cross piece located parallel to the cross bar and behind the cross bar, a brace disposed approximately parallel to the draft line of the implement and connecting the cross bar with the cross piece, a fork including a shank and rearwardly extended arms, means for securing the shank to the brace at a point between the bar and the cross piece, the arms being downwardly convexed, where they pass under the cross piece, so that the arms will be spaced from the lower edge of the cross piece, the arms being upwardly curved to the rear of the said downwardly convexed portions and to the rear of the cross piece, the arms terminating in downwardly inclined rear ends, a supplemental supporting wheel located between the arms and journaled on the rear ends of the arms, a main ground wheel mounted for rotation on the frame near to the forward end of the frame, and handles mounted on the rear portion of the frame and extending backwardly and upwardly with respect to the supplemental wheel.

In testimony that I claim the foregoing as my own, I have hereto affixed my signature.

JOHN A. CARLTON.